United States Patent [19]

Koyama et al.

[11] 4,444,494
[45] Apr. 24, 1984

[54] COPYING APPARATUS EQUIPPED WITH AN ORIGINAL-SUPPORT DEVICE, AND AN ORIGINAL-HOLDING MECHANISM THEREFOR

[75] Inventors: Shigeo Koyama, Toyonaka; Ryutaro Yamagata, Nishinomiya; Nobuhiko Kozuka, Suita; Hiromi Sakata, Neyagawa, all of Japan

[73] Assignee: Mita Industrial Co., Ltd., Japan

[21] Appl. No.: 458,689

[22] Filed: Jan. 17, 1983

Related U.S. Application Data

[62] Division of Ser. No. 292,842, Aug. 14, 1981.

[30] Foreign Application Priority Data

Aug. 27, 1980 [JP] Japan ............... 55-120578

[51] Int. Cl.³ ............................................. G03B 27/62
[52] U.S. Cl. .................................... 355/75; 355/25
[58] Field of Search ................. 355/25, 72, 73, 74, 355/75, 76

[56] References Cited

U.S. PATENT DOCUMENTS 2,774,289 12/1956 Collins ..................... 355/75
3,726,589 4/1973 Difulvio et al. ............ 355/25
3,740,132 6/1973 Komori et al. ............. 355/11
3,950,090 4/1976 Washio et al. ............. 355/8

FOREIGN PATENT DOCUMENTS

784282 10/1957 United Kingdom ........... 355/75

*Primary Examiner*—Monroe H. Hayes
*Attorney, Agent, or Firm*—Beveridge, DeGrandi & Kline

[57] ABSTRACT

An original-holding mechanism for an original-support device is disclosed which includes a flexible holding member for covering an original document placed on a transparent plate and a rigid supporting member located outwardly of the original-holding member. One end edge portion of the original-holding member is mounted adjacent to one end edge of the transparent plate. The base portion of the supporting member is mounted for pivotal movement about an axis extending along said one edge of the transparent plate as a center. The free end edge portion of the original-holding member is connected to the free end portion of the supporting member for movement over a predetermined range in a direction perpendicular to said axis.

5 Claims, 12 Drawing Figures

Fig. 7-C ent with an original-support device, and more specifically, to a copying apparatus in which an original-support device is mounted reciprocably on a housing through a sliding mechanism. This invention also pertains to an original-holding mechanism for a reciprocable or fixed original-support device.

COPYING APPARATUS EQUIPPED WITH AN ORIGINAL-SUPPORT DEVICE, AND AN ORIGINAL-HOLDING MECHANISM THEREFOR

This is a division of application Ser. No. 292,842, filed Aug. 14, 1981.

FIELD OF THE INVENTION

This invention relates to a copying apparatus equipped with a reciprocably moving original-support device, and more specifically, to a copying apparatus in which an original-support device is mounted reciprocably on a housing through a sliding mechanism. This invention also pertains to an original-holding mechanism for a reciprocable or fixed original-support device.

DESCRIPTION OF THE PRIOR ART

As is well known in the art, copying apparatuses are in widespread use which include an original-support device mounted reciprocably on a housing. In this type of copying machines, a sliding mechanism consisting of a combination of an outside rail, an inside rail and holding plate disposed between the outside and inside rails for rotatably holding a plurality of balls which contact both of these rails (one example is a sliding mechanism sold under the tradename "ACCURIDE" by Japan Accuride Co., Ltd.) is generally used to mount the original-support device reciprocably on the housing. In this type of sliding mechanism, either one of the outside and inside rails is fixed to the housing and the other to the original-support device, and by the action of the plurality of balls held by the holding plate between these rails, the original-support device is held on the housing for sliding movement in the axial direction of the rails.

However, known copying machines which use the aforesaid sliding mechanism for mounting the original-support device reciprocably on the housing have certain defects or disadvantages to be described below in detail.

In a copying apparatus having an original-support device reciprocably mounted on a housing, the original-support device is caused to reciprocate as required by the action of a suitable control mechanism during the performance of a copying cycle. In order to prevent movement of the original-support device beyond a certain predetermined range which is due to an error in the operation of control elements or an inertial energy of the original-support device and thereby to avoid an accident which may be caused by the excessive movement of the support device, it is important in normal instances to provide means for hampering movement of the original-support device relative to the housing beyond the predetermined range. On the other hand, at the time of repair, inspection or cleaning of component parts within the housing, such as an optical unit, it is necessary to move the original-support device beyond the predetermined range and thus detach it from the housing. In other words, in the copying machine having the original-support device reciprocably mounted on the housing, it is strongly desired to prevent exactly the movement of the support device beyond the predetermined range in normal cases, but, whenever required, to move it beyond the predetermined range and thereby detach it from the housing. Generally, in the sliding mechanism mentioned above, each of the two ends of one of the outside and inside rails has integrally formed therein a stop face against which each of the opposite ends of the holding plate can abut, and one end portion of the other of said outside and inside rails has integrally formed therein a stop face against which one end portion of the holding plate can abut. Accordingly, one end of the range of relative movement of the outside and inside rails, i.e. one end of the range of movement of the original-support device relative to the housing, is restricted by the position at which one end of the holding plate abuts against the stop face formed at one end portion of the other of the aforesaid outside and inside rails and the other end of the holding plate abuts against the stop face formed in the other end portion of said one of the outside and inside rails, so that the original-support device cannot move beyond this position. However, no stop face for abutment against the other end of the holding plate exists in the other end portion of the other of the outside and inside rails. As will be readily understood, this is because if a stop face is provided in advance in the other end portion of the other of the outside and inside rails, combining of the sliding mechanism, and therefore, mounting of the original-support device on the housing, become impossible, and also because if the aforesaid stop face is formed after the original-support device has been mounted on the housing, it is impossible to detach the original-support device from the housing. Because of this structure, the other end of the range of relative movement of the outside and inside rails, i.e. the other end of the range of movement of the original-support device with respect to the housing, in not restricted by the inherent structure of the sliding mechanism, and the original-support device moves freely relative to the housing without being restricted at all in a specified direction.

Thus, in conventional copying machines, there is detachably mounted on the housing a stop member against which a given part of the original-support device abuts when the original-support device has moved to a predetermined position in the aforesaid specified direction. When such a stop member is provided detachably on the housing, the range of movement of the original-support device in the specified direction is restricted by the position at which a given part of the original-support device itself abuts against the stop member, and therefore, both ends of the range of movement of the original-support device relative to the housing are restricted whereby the movement of the original-support device beyond the predetermined range can be exactly prevented. When it is desired to detach the original-support device from the housing, the stop member disposed on the housing is detached to permit free movement of the original-support device in the above-specified direction, thus enabling the original-support device to be removed from the housing. The conventional copying apparatuses, however, have the following defects and disadvantages. Specifically, it is necessary to provide the above stop member for restricting the movement of the original-support device generally at that area of the top surface of the housing which is covered with the original-support device so that when the original-support device has moved to the predetermined position, the stop member abuts against that part of the original-support device which is on its undersurface instead of that portion of the original-support device which is exposed to view, for example its end surface. In order to minimize the floor space required for installation of the copying machine and make the copying machine itself as compact as possible, it is generally desirable to construct the original-support device in a "two-side" moving type so that, for example, it makes a preparatory movement from its stop position on the housing to a position at which it projects partly from one end of the housing, then moves for an exposure cycle to a position at which it projects partly from the other end of the housing, and thereafter returns to the stop position, thus reciprocating between the position at which it projects partly from one end of the housing and the position at which it projects partly from the other end of the housing. In such a "two-side" moving-type, the range of its movement is necessarily restricted, and therefore, it is impossible or extremely difficult to bring the stop member on the housing into abutment against that part of the original-support device which is exposed to view, for example its end surface. In a "one-side" moving-type original-support device which is adapted to reciprocate between a position on the housing and a position at which it projects partly from one end of the housing, it is possible to provide a stop member on the other end portion of the housing so that when the original-support device has moved to its limit, the stop member may abut against one end surface of the original-support device. However, it will be easily understood that this results in exposing of the stop member always to view irrespective of the position of the original-support device, thus giving adverse effects to the appearance of the copying machine.

When the stop member is disposed in that area of the top surface of the housing which is covered with the original-support device so that when the original-support device has moved to its limit of movement, that part of the original-support device which is located on its undersurface abuts against the stop member, the structure of the stop member and the method of mounting it on the housing are relatively complex and costly, and in many cases, a specially shaped portion must be formed on the undersurface of the original-support device for abutment against the stop member. On the other hand, if the stop member is disposed in that area of the top surface of the housing which is covered with the original-support device, the operation of detaching the stop member from the housing, which is to be performed as required to remove the original-support device from the housing, becomes considerably difficult and troublesome.

Not only the original-support device mounted reciprocably on the top surface of the housing but also an original-support device fixed at a predetermined position on the housing is generally constructed such that it includes a transparent plate and an original-holding mechanism pivotable between its closed position at which it covers the transparent plate and its open position at which it exposes the transparent plate to view, and in operation, an original document to be copied is placed on the transparent plate, and then the original-holding mechanism is brought to its closed position to cover the transparent plate and the original document on it and thereby to hold the original document at a predetermined position on the transparent plate and prevent leakage of light which has been irradiated from inside the housing toward the transparent plate. Basically, the original-holding mechanism is comprised of a flexible original-holding member for covering the transparent plate and the original document thereon and a rigid supporting member disposed outwardly of the original-holding member. The original-holding member is connected to the supporting member so that when the original-holding mechanism is caused to pivot between its closed and open positions, they move substantially as a unit.

In the conventional original-holding mechanism, the original-holding member and the supporting member are caused to pivot substantially as a unit between the aforesaid closed and open positions, and during this pivotal movement, the original-holding member scarcely flexes but behaves substantially as if it were a rigid body. This behavior gives rise to the following problem to be solved.

In particular, if the original document placed on the transparent plate is a single sheet, the original document on the transparent plate might be moved by the action of air flow generated by the pivotal movement of the original-support mechanism from its open position to its closed position. Accordingly, in the pivoting of the original-holding mechanism from its open position to its closed position, the operator must manipulate the holding mechanism by one hand and hold the original document on the transaparent plate by the other hand to hamper its movement, and the operation is fairly complex. Furthermore, when the original document is to be taken out from the transparent plate by pivoting the original-holding mechanism from its closed position to its open position, the original document may move incident to the movement of the original-holding mechanism (particularly by adhesion to the inner surface of the original-holding member), and the operation of taking out the original document is obstructed.

The above problem with the conventional original-holding mechanism could be solved, as will be more clearly understood from descriptions given hereinbelow, by making the original-holding mechanism only of a flexible original-holding member and in pivoting it from its open position to its closed position or vice versa, properly flexing the flexible holding member so that the inner surface of the holding member is progressively contacted with, or detached from, the original document on the transparent plate from its one end edge to its other end edge. In this structure, however, the flexible original-holding member should be directly manipulated, and the operation of the original-holding mechanism itself becomes complex. Furthermore, in the absence of any means for supporting the flexible original-holding member, the original-holding mechanism cannot be maintained at a suitable open position.

SUMMARY OF THE INVENTION

It is a first object of this invention to provide an improved copying apparatus having an original-support device reciprocably mounted on a housing through a sliding mechanism, in which the movement of the original-support device with respect to the housing in a specified direction is restricted, as desired, at a predetermined position by means of a stop member which is much simpler in structure and less costly than those stop members which are used in conventional copying apparatuses and can be mounted on, and detached from, a predetermined position very easily and rapidly.

It is a second object of this invention to provide a novel and excellent original-holding mechanism for an original-support device in a copying apparatus, which gives a skillful solution to the aforesaid problem with the conventional original-holding mechanism without giving rise to a new problem.

According to this invention, the first object is achieved by a copying apparatus of the type in which an original-support device is mounted reciprocably on a housing through a sliding mechanism, said sliding mechanism being comprised of an outside rail fixed to one of the original-support device and the housing, an inside rail fixed to the other of said original-support device and housing, and disposed between the outside and inside rails, a holding plate rotatably holding a plurality of balls which contact both of the outside and inside rails, each of the opposite ends of one of the outside and inside rails having disposed thereat a stop face against which each of the opposite ends of the holding plate can abut, and one end portion of the other of said outside and inside rails having disposed thereat a stop face against which one end of the holding plate can abut; characterized in that a stop member defining a stop face against which the other end of the holding plate can abut is detachably disposed at the other end portion of the other of said outside and inside rails.

According to another aspect, the second object is achieved by an original-holding mechanism for an original-support device in a copying apparatus, said holding mechanism including a flexible original-holding member for covering an original document placed on a transparent plate and a rigid supporting member located outwardly of the original-holding member; characterized in that one end edge portion of the original-holding member is mounted adjacent to one end edge of the transparent plate, the base portion of the supporting member is mounted for pivotal movement about an axis extending along said one edge of the transparent plate as a center, and the free end edge portion of the original-holding member is connected to the free end portion of the supporting member for movement over a predetermined range in a direction perpendicular to said axis.

BRIEF DESCRIPTION OF THE ACCOMPANYING DRAWINGS

FIGS. 4-A and 4-B are a top plan view and a sectional view which respectively show the states of the sliding mechanism when the original-support device is located at its central stop position;

FIGS. 5-A and 5-B are a front elevation and a sectional view showing the states of the sliding mechanism when the original-support device has moved to its restricted position on one side;

FIGS. 6-A and 6-B are a top plan view and a sectional view which show the states of the sliding mechanism when the original-support device has moved to near its restricted position on the other side; and FIGS. 7-A, 7-B and 7-C are partial side elevations which show the state at various positions of an original-holding mechanism used in the original-support device in the copying apparatus shown in FIG. 1 in order to illustrate its behavior at the time of the movement of the original-holding mechanism between its open and closed positions.

DETAILED DESCRIPTION OF THE PREFERRED EMBODIMENTS

The present invention will be described in greater detail with reference to the accompanying drawings showing one embodiment of the copying apparatus constructed in accordance with this invention.

Figure 1:
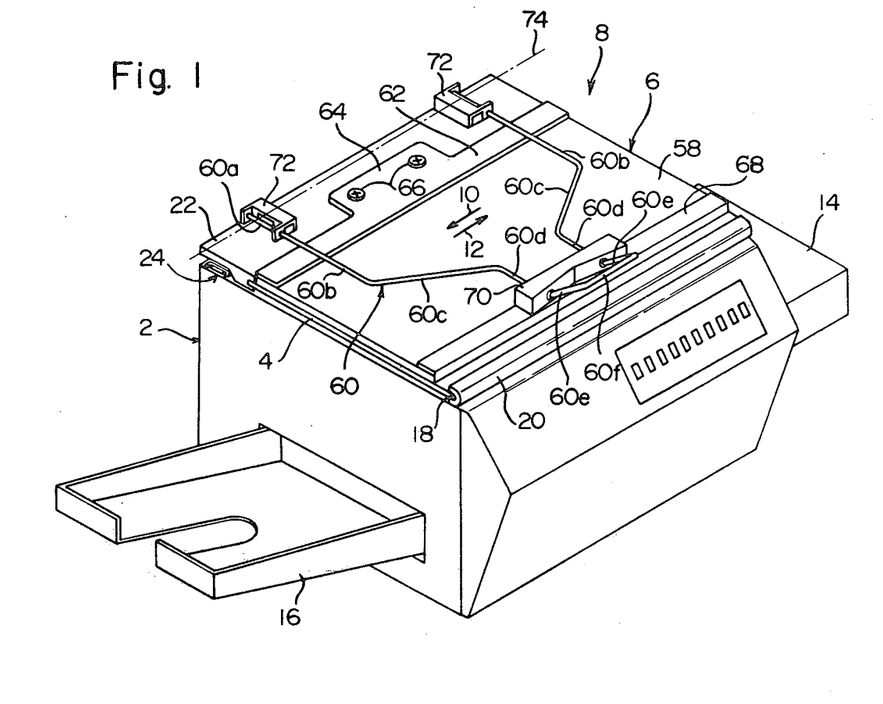
FIG. 1 is a perspective view showing one embodiment of the copying apparatus in accordance with this invention.

Referring to FIG. 1, the general construction of the illustrated copying apparatus is briefly described. The illustrated copying apparatus has a substantially rectangular housing shown generally at 2. On the top surface of the housing 2 is mounted an original-support device shown generally at 8 which includes a transparent plate 4 and an original-holding mechanism 6. The original-support device 8 is adapted for movement in the directions shown by arrows 10 and 12. A copying paper cassette 14 is inserted into one end wall of the housing 2, and at the other end wall of the housing 2, a receiver tray 16 is provided for receiving a copy paper discharged from inside the housing 2. Within the housing 2 are disposed various elements (not shown) required to form a copied image corresponding to the image of an original document held by the original-support device 8 on a copying paper fed from the paper cassette 14.

The manner of mounting the original-support device 8 in the illustrated copying apparatus will be described. A stationary support frame 20 having a rearwardly opened channel 18 is fixed to the front end edge of the housing 2, and the front end edge of the transparent plate 4 is received in the channel 18 of the stationary support frame 20 for sliding movement in the directions shown by arrows 10 and 12. A movable support frame 22 is fixed to the rear end edge of the transparent plate 4, and the original-holding mechanism 6 is mounted on the movable support frame 22 for pivotal movement between its closed position at which it covers the transparent plate 4 (the position shown in FIG. 1) and its open position at which it exposes the transparent plate 4 to view (the construction of the original-holding mechanism 6 itself will be described in detail hereinbelow). The movable support frame 22 is mounted on the rear end edge portion of the top surface of the housing 2 for sliding movement in the directions of arrows 10 and 12 by a sliding mechanism shown generally at 24. As a result, the entire original-support device 8 comprised of the transparent plate 4, the original-holding mechanism 6 and the movable support frame 22 is mounted for sliding movement in the directions of arrows 10 and 12.

Now, referring to FIGS. 2 and 3 taken together with FIG. 1, the construction of the sliding mechanism 24 will be described. The illustrated sliding mechanism 24, which may, for example, be a sliding mechanism sold under the tradename "ACCURIDE" by Japan Accuride Co., Ltd., has an outside rail 26, an inside rail 28, and a holding plate 30 disposed between the rails 26 and 28. Either one of the outside rail 26 and the inside rail 28 is fixed to the original-support device 8, and the other, to the housing 2. In the illustrated embodiment, the outside rail 26 is fixed to the original-support device 8, and more specifically to the undersurface of the support frame 22, by a suitable means such as a setscrew (not shown), and the inside rail 28 is fixed to the housing 2, more specifically to the rear end edge portion of the top surface of the housing 2, by a suitable means such as a setscrew 32. The holding plate 30 interposed between the outside rail 26 and the inside rail 28 rotatably supports balls 34 respectively at a plurality of spaced positions in its both side wall portions. A plurality of such balls 34 are interposed between the side wall portion of the outside rail 26 and the side wall portion of the inside rail 28, and kept in contact with both of the rails 26 and 28. Stop faces 36 and 38 (see FIGS. 4-B, 5-B and 6-B) are disposed at the opposite end portions of either one of the outside rail 26 and the inside rail 28 (the outside rail 26 in the illustrated embodiment). In the illustrated embodiment, the stop faces 36 and 38 are formed by partly bending the material, which constitutes the outside rail 26, downwardly or inwardly. One end portion of the other of the outside rail 26 and the inside rail 28 (the inside rail 28 in the illustrated embodiment) has disposed thereat a stop face 40 (see FIGS. 4-A to 6-B) which can be formed by partly bending the material constituting the inside rail 28 upwardly or inwardly. No such stop face is formed at the other end portion (the left end portion in FIGS. 4-A to 6-B) of the inside rail 28.

In the copying apparatus constructed in accordance with this invention, it is essential that a stop member 42 should be detachably provided on the aforesaid other of the outside rail 26 and the inside rail 28 of the sliding member 24, i.e. the aforesaid other end portion of the inside rail 28 in the illustrated embodiment, at which the aforesaid stop face is not formed. In the illustrated embodiment, an opening 44 is formed in the aforesaid other end portion (the left end portion in FIGS. 4-A to 6-B) of the inside rail 28, and the stop member 42 is disposed in the opening 44 and fixed to the top surface of the housing 2 by a suitable means such as a setscrew 46, preferably in such a manner that its position can be adjusted in the reciprocating directions of the original-support device 8 (that is, the directions shown by arrows 10 and 12).

Furthermore, in the illustrated embodiment, a brake member 48 is disposed within the opening 44 of the inside rail 28 and inwardly of the stop member 42, and fixed to the top surface of the housing 2 by a suitable means such as a setscrew 50, preferably in such a manner that its position can be adjusted in the reciprocating directions (the directions shown by arrows 10 and 12) of the original-support device 8.

In mounting the original-support device 8 on the housing 2 in the copying apparatus described above for slidable movement in the directions shown by arrows 10 and 12, it is first necessary to fix the outside rail 26 to the lower surface of the movable support frame 22 of the original-support device 8 and the inside rail 28 to the rear end edge portion of the top surface of the housing 2. Then, the holding plate 30 holding a plurality of balls 34 is combined with the inside rail 28 in the state shown in FIGS. 2 and 3. At the same time, the outside rail 26 fixed to the original-support device 8 is combined with the inside rail 28 and the holding plate 30 in the state illustrated in FIGS. 2 and 3. Since the stop member 42 and the brake member 48 are not disposed in the aforesaid other end portion of the inside rail 28, the holding plate 30 and the outside rail 26 can be combined with the inside rail 28 by inserting the holding plate 30 and the outside rail 26 from the aforesaid other end portion of the inside rail 28 and allowing them to slide. After the original-support device 8 has been mounted slidably on the housing 2 in the above manner, the original-support device 8 is moved in the direction shown by arrow 12. As a result, the outside rail 26 and the holding plate 30 are also moved in the direction of arrow 12, and the opening 44 formed in the aforesaid other end portion of the inside rail 28 is not covered with the holding plate 30, outside rail 26 and original-support device 8 but comes to view. After this state has been achieved, the stop member 42 and the brake member 48 are set in the opening 44 formed in the aforesaid other end portion of the inside rail 28, and fixed at predetermined positions.

Figures 4, 5:
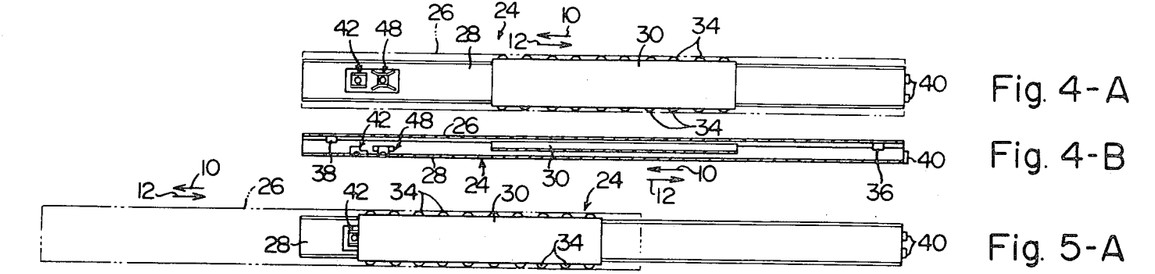
Figure 5:
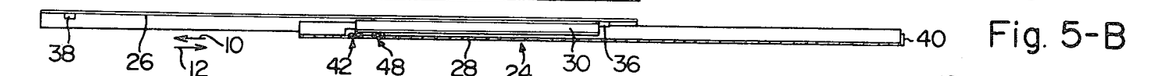

When the copying apparatus is not in operation, the original-support device 8 exists at its central stop position shown in FIG. 1, and the sliding member 24 is in the state shown in FIGS. 4-A and 4-B. When the copying apparatus is set in operation, the original-support device 8 is caused to reciprocate by the action of a suitable drive mechanism (not shown) in the manner described below. First, the support device is caused to make a preparatory movement in the direction of arrow 10 to a predetermined start-of-exposure position, and after some time interval, is moved for an exposure cycle to an end-of-exposure position beyond the central stop position in the direction of arrow 12. Finally, it is caused to make a return movement in the direction of arrow 10 to its central stop position. When the original-support device 8 is moved for preparation to the above start-of-exposure position, the outside rail 26 and the holding plate 30 are concomitantly moved in the direction of arrow 10 (in which case the plurality of balls 34 are rotated in response to the movement of the outside rail 26 relative to the inside rail 28) to a position slightly upstream of the restricted position shown in FIGS. 5-A and 5-B (the restricted position will be described in detail hereinbelow), i.e. slightly on the right of the position illustrated in FIGS. 5-A and 5-B. When the original-support device 8 is moved for an exposure cycle to the aforesaid end-of-exposure position, the outside rail 26 and the holding plate 30 are concomitantly moved in the direction of arrow 12 to a position slightly upstream of the position shown in FIGS. 6-A and 6-B (this position will be described in detail hereinbelow), i.e. a position slightly on the left of the position illustrated in FIGS. 6-A and 6-B).

It is general in the aforesaid reciprocating movement that when the original-support device 8 has been moved for an exposure cycle to the end-of-exposure position in the direction of arrow 12, a driving force tending in the reverse direction, i.e. the direction of arrow 10, is immediately applied to cause it to make a return movement. Accordingly, so long as a driving mechanism (not shown) for the original-support device 8 functions normally, the original-support device 8 which has been moved to the end-of-exposure position is scarcely moved in the direction of arrow 12 beyond the end-of-exposure position by the action of an inertial force. However, when the original-support device 8 has been moved for preparation in the direction of arrow 10 from its central stop position to its start of-exposure position, it is not immediately caused to move for an exposure cycle in the reverse direction, i.e. in the direction of arrow 12, but the exposure cycle movement is started after a certain time interval from the end of the preparatory movement. In this situation, therefore, the support device 8 which has been moved for preparation in the direction of arrow 10 to the start-of-exposure position is likely to move in the direction of arrow 10 beyond the start-of-exposure position by an inertial force acting on it.

However, the illustrated copying apparatus constructed in accordance with this invention is free from this likelihood. When the original-support device 8 in this invention has been moved for start of the exposure cycle in the direction of arrow 10, the brake member 48 disposed in the aforesaid other end portion of the inside rail 28 of the sliding member 24 frictionally engages the holding plate 30 and thus exerts a braking action on it, thereby preventing the support device 8 from being moved further in the direction of arrow 10 by the action of an inertial force. More specifically, when the original-support device 8 in the illustrated copying apparatus has made a preparatory movement in the direction of arrow 10 to the start-of-exposure position, a pair of engaging surfaces 52 (FIG. 2) of the brake member 48 frictionally engage the outside surfaces of a pair of inside upstanding wall portions 54 formed in the holding plate 30 and exert a braking action, thereby preventing the holding plate 30 from moving further in the direction of arrow 10. When the movement of the holding plate 30 relative to the inside rail 28 has been so prevented, the rotation of the balls 34 held by the holding plate 30 is hampered because they are in contact with the inside rail 28. The braking action is transmitted from the balls 34 to the outside rail 26 with which the balls 34 are kept in contact. As a result, the outside rail 26 and the support device 8 are prevented from moving in the direction of arrow 10.

When the driving mechanism (not shown) for the support device 8 is functioning normally, the support device 8 is caused to reciprocate as required between the start-of-exposure position and the end-of-exposure position. In the event that a control element (for example, a detecting element such as a microswitch) of the driving mechanism operates erroneously or the braking action of the brake member 48 fails for some reason, the support device 8 may move further to a great extent in the direction of arrow 10 beyond the start-of-exposure position or may move to a great extent in the direction of arrow 12 beyond the end-of-exposure position, leading to the occurrence of an accident such as the falling of the support device 8 from the housing 2. In the copying apparatus constructed in accordance with this invention, however, the movement of the support device 8 in the directions of arrows 10 and 12 is exactly limited to predetermined restricted positions by the action of the stop faces 36 and 38 (FIGS. 4-B, 5-B and 6-B) disposed in the opposite end portions of the outside rail 26, the stop face 40 (FIGS. 4-A to 6-B) disposed in one end portion of the inside rail 28, and the stop member 42 disposed in the other end portion of the inside rail 28. Thus, the aforesaid accident can be exactly prevented.

Figure 6:
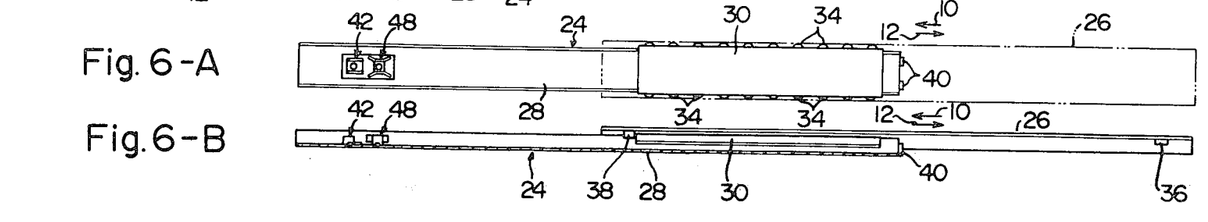

More specifically, when the support device 8 in the copying apparatus of this invention moves in the direction of arrow 10 beyong the start-of-exposure position, the stop face 36 disposed at one end portion of the outside rail 26 abuts against one end (the right end) of the holding plate 30 and the other end (left end) of the holding plate 30 abuts against the stop face 56 (FIG. 2) defined by the stop member 42 disposed at the aforesaid other end portion of the inside rail 28, as shown in FIGS. 5-A and 5-B. Consequently, the movement of the holding plate 30 and the outside rail 26 with respect to the inside rail 28 in the direction of arrow 10 is exactly hampered, and therefore, the movement of the support device 8 with respect to the housing 2 in the direction of arrow 10 is exactly hampered. On the other hand, when the support device 8 moves in the direction of arrow 12 beyond the end-of-exposure position, the stop surface 38 disposed in the other end portion of the outside rail 26 abuts against the aforesaid other end (left end) of the holding plate 30 to prevent further movement of the outside rail 26 with respect to the holding plate 30 in the direction of arrow 12, as shown in FIGS. 6-A and 6-B. As a result, the rotation of the balls 34 held by the holding plate 30 is hampered because the balls 34 are kept in contact with the outside rail 26. Since the balls 34 are also in contact with the inside rail 28, the braking action is transmitted from the inside rail 28 to the holding plate 30 through the balls 34, thereby exerting a braking action on the support device 8. When the support device 8 further moves in the direction of arrow 12 despite this braking action, the aforesaid one end (right end) of the holding plate 30 abuts against the stop face 40 disposed at one end portion of the inside rail 28, whereby the movement of the holding plate 30 and the outside rail 26 with respect to the inside rail 28 in the direction of arrow 12 is exactly hampered, and therefore the movement of the support device 8 relative to the housing 2 in the direction of arrow 12 is exactly hampered.

Figures 2, 3:
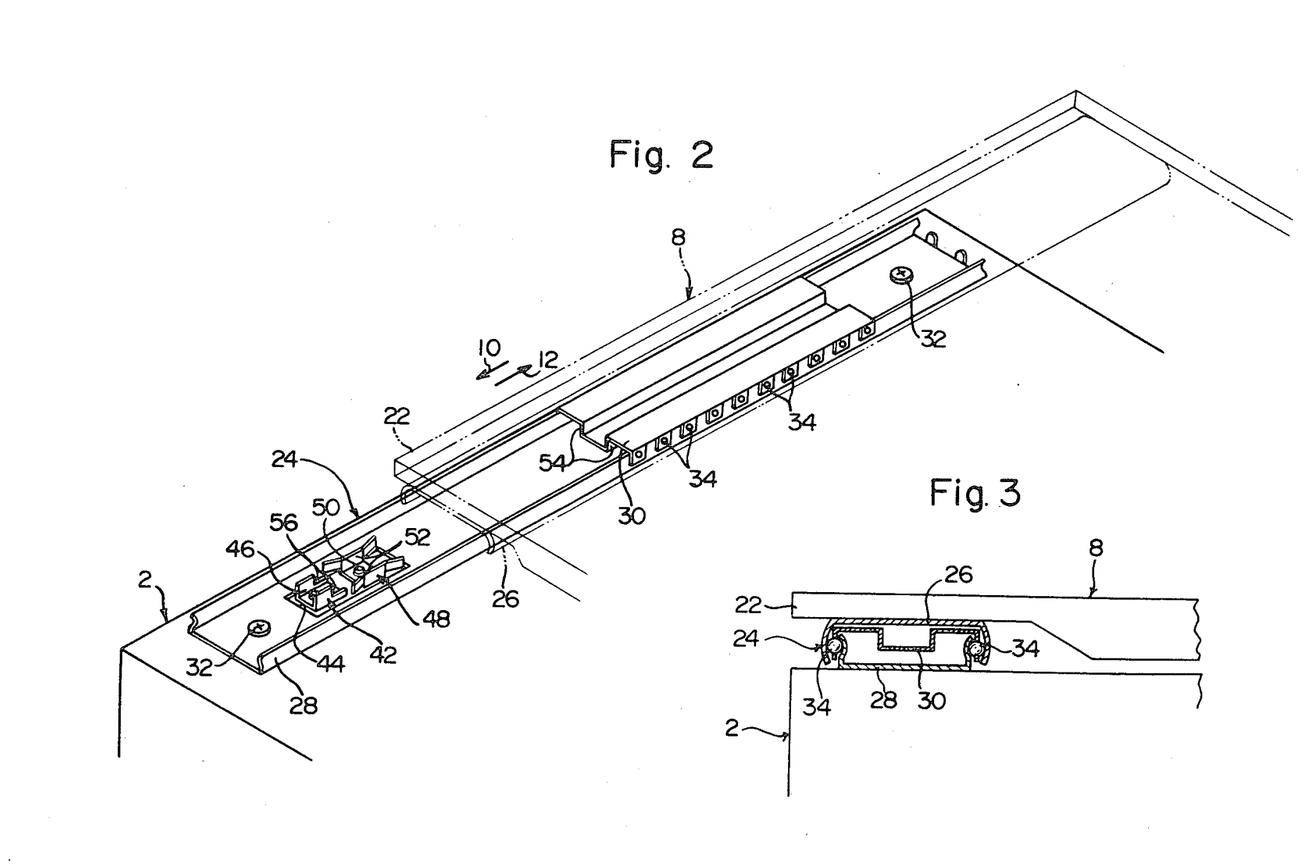
FIG. 2 is a partial perspective view showing a sliding mechanism used in the copying apparatus shown in FIG. 1.
FIG. 3 is a partial cross-sectional view showing the sliding mechanism used in the copying apparatus shown in FIG. 1.

When it is desired to detach the original-support device 8 from the housing 2 for repair, inspection or cleaning of an optical unit (not shown) or other elements disposed within the housing 2, the support device 8 is moved in the direction of arrow 12 from its central stop position by a required amount to bring the stop member 42 and the brake member 48 disposed in the aforesaid other end portion of the inside rail 28 to view, as shown in FIG. 2. Then, the stop member 42 and the brake member 48 are removed (the removal of the brake member 48 is not essential but preferable). As a result, the support device 8 can be moved in the direction of arrow 10 without any restriction, and therefore, the support device 8 can be detached from the housing 2 by moving it in the the direction of arrow 10 beyond the start-of-exposure position.

In the copying apparatus of the invention, the stop member 42 attached for limiting the movement of the support device 8 in the direction of arrow 10 to a predetermined restricted position can achieve the desired operation and effect if it has a shape defining the stop face 56 (FIG. 2) against which the end of the holding plate 30 can abut and also if it is fixed at a given position in the aforesaid other end portion of the inside rail 28. Accordingly, the stop member 42 in accordance with this invention is simpler and less costly in structure and in the manner of mounting than a conventional stop member which is formed in a shape permitting abutment thereagainst of a specified site of the undersurface of the original-support device and disposed in that area on the housing which is always covered with the support device.

When, as shown clearly in FIG. 2, the support device 8 is moved in the direction of arrow 12 by a required amount from its central stop position, the aforesaid other end portion of the inside rail 28 is exposed to view without being covered with the support device 8, outside rail 26 and holding plate 30. Accordingly, the stop member 42 (and the brake member 48) can be very easily and rapidly mounted on, and detached from, predetermined positions at the aforesaid other end portion of the inside rail 28.

In addition, the stop member 42 (and the brake member 48) disposed in the other end portion of the inside rail 28 are covered with the support device 8 when the support device 8 is at its central stop position shown in FIG. 1, and exposed to view only when, in the reciprocating movement, the support device 8 has moved a predetermined distance in the direction of arrow 12 from its central stop position. Hence, the presence of the stop member 42 (and the brake member 48) scarcely impairs the appearance of the copying apparatus.

In the illustrated embodiment, the opening 44 is formed in the aforesaid other end portion of the inside rail 28, and the stop member 42 (and the brake member 48) are provided in the opening 44 to fix them to the top surface of the housing 2. If desired, the formation of the opening 44 in the other end portion of the inside rail 28 may be omitted, and instead, the stop member 42 (and the brake member 48) may be directly fixed to the bottom wall of the inside rail 28.

Furthermore, in the illustrated embodiment, the stop face 40 disposed at one end portion of the inside rail 28 is formed integrally with the inside rail 28. If desired, the stop face 40 may also be defined by a stop member which is fixed detachably. Furthermore, instead of, or in addition to, defining the stop face 56 (and the stop face 40) of the inside rail 28 fixed to the housing 2 by the detachably attached stop member 42, at least one of the stop faces 36 and 38 of the outside rail 26 fixed to the support device 8 may be defined by a detachably fixed stop member.

Moreover, in the illustrated embodiment, the brake member 48 is provided only at the aforesaid other end portion of the inside rail 28. In addition to, or instead of, this structure, another brake member may be disposed on the aforesaid one end of the inside rail 28 to exert a braking action at a predetermined position. Also, in addition to, or instead of, providing the brake member 48 in the inside rail 28 fixed to the housing 2, a brake member may be disposed in the outside rail 26 fixed to the support device 8.

Now, with reference to FIGS. 1 and 7-A, 7-B and 7-C, the original-holding mechanism 6 improved in accordance with this invention for use in the original-support device 8 will be described.

The original-holding mechanism 6 includes a flexible original-holding member 58 and a rigid supporting member 60. In the illustrated embodiment, the original-holding member 58 is made of a suitable material having sufficient flexibility and is of a rectangular plate-like shape. It has a size large enough to cover an irradiation area (copying area) on the transparent plate 4. To one end edge portion of the original-holding member 58, i.e. the outside surface of its rear end edge portion, is fixed a reinforcing piece 62 extending therealong and formed of a semi-rigid or rigid material by a suitable method such as bonding. As clearly shown in FIG. 1, a projecting portion 64 projecting rearwardly beyond the rear end edge portion of the original-holding member 58 is formed integrally in an intermediate portion of the reinforcing piece 62, and is fixed to the top surface of the movable support frame 22 by a suitable means such as a pair of bolts 66. Thus, in the illustrated embodiment, the rear end edge portion of the original-holding member 58 is mounted on the movable support frame 22 adjacent to one end edge, i.e. the rear end edge, of the transparent plate 4 through the reinforcing piece 62. Furthermore, in the illustrated embodiment, a reinforcing piece 68 formed of a semi-rigid or rigid material is likewise fixed to the outside surface of the free end edge portion, i.e. the front end edge portion, of the original-holding member 58 by a suitable method such as bonding. A connecting member 70 made of a semi-rigid or rigid material is fixed to the top surface of an intermediate portion of the reinforcing piece 68.

On the other hand, the support member 60 disposed outwardly of the original-holding member 58 is formed of a material having flexibility. In the illustrated embodiment, the supporting member 60 is formed of a metallic rod bent in the shape shown in FIG. 1. Both end portions 60a of the metallic rod forming a base portion of the supporting member 60 are mounted on the top surface of the movable support frame 22 by suitable mounting means 72 for pivotal movement about an axis 74 extending along one end edge, i.e. the rear end edge, of the transparent plate 4 as a center. Conveniently, the mounting means 72 have a pair of arcuate frictional surfaces and an elastic member for elastically causing abutment of the arcuate frictional surfaces against each other as disclosed in Japanese Patent Application No. 167022/1979 (filed on Dec. 21, 1979 entitled "MECHANISM FOR SUPPORTING AN ORIGINAL-HOLDING MEMBER OF A COPYING MACHINE,") and have such a form as to maintain the supporting member 60 at a suitable position, such as shown in FIGS. 7-A and 7-B, although they are not limited to this specific example. The illustrated supporting member 60 made of a metallic rod, as clearly shown in FIG. 1, has portions 60b extending forwardly from both end portions 60a in a direction substantially perpendicular to axis 74, portions 60c extending from the portions 60b forwardly in an inwardly inclined manner, portions 60a extending from the portions 60c forwardly in a direction substantially perpendicular to the axis 74, portions 60e extending from the portions 60d forwardly in an upwardly inclined manner, and a grip portion 60f extending between the portions 60e and parallel to the axis 74. The connecting member 70 fixed to the original-holding member 58 is slidably connected to the portions 60d of the supporting member 60. The connecting member 70 can freely slide with respect to the supporting member 60 over a range 76 (FIGS. 7-A, 7-B and 7-C) between the junction of portion 60c and portion 60d and the junction of the portion 60d and the portion 60e. Thus, in the illustrated embodiment, the free end edge portion of the original-holding member 58 is connected to the free end portion of the supporting member 60 through the reinforcing piece 68 and the connecting member 70 and member 70 is fixed to the original-holding member 58 in such a manner that it can freely move over the predetermined range 76 in a direction perpendicular to the axis 74.

The operation and effect of the original-holding mechanism 6 having the above-mentioned structure will be described.

Figure 7:
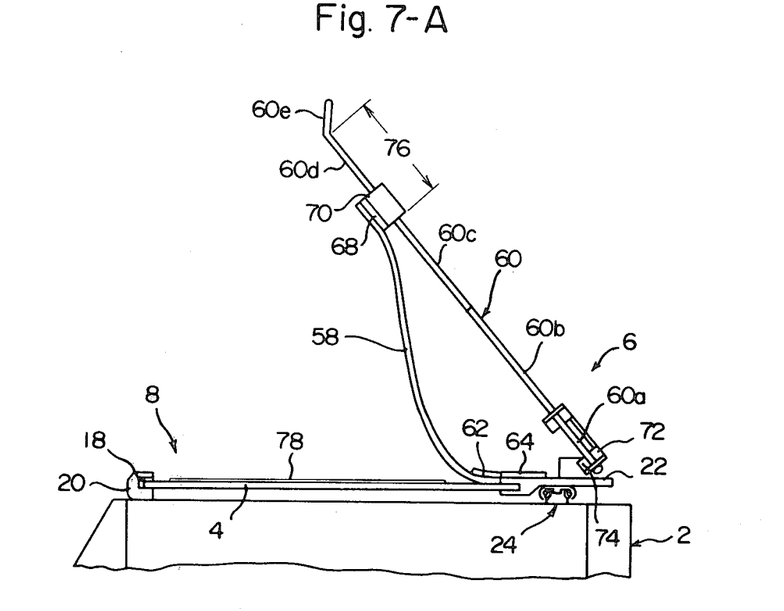

In starting the copying operation, the grip portion 60f of the supporting member 60 is held and the original-holding mechanism 6 is moved toward a predetermined open position, for example the position shown in FIG. 7-A. As a result, owing to the weight of the original-holding member 58, the free end edge portion of the holding member 58 is moved relative to the supporting member 60 in a direction perpendicular to the axis 74 until it comes to a position at which the connecting member 70 abuts against the junction of portion 60c and portion 60d of supporting member 60, and the holding member 58 on the whole flexes in the shape shown in FIG. 7-A. In a direction parallel to the axis 74 (the directions shown by arrows 10 and 12 in FIG. 1), the flexing of the original-holding member 58 is prevented by the presence of the reinforcing pieces 62 and 68, and therefore, the original-holding member 58 does not substantially bend in a direction parallel to the axis 74. Then, an original document 78 to be copied is placed in position in a predetermined area, i.e. an irradiation area (copying area), on the surface of the transparent plate 4. Although not shown in the drawings, it is desirable to fix a known frame member (not shown) which may be made of a metallic band-like piece, etc. to the peripheral edge portion of the top surface of the transparent plate 4 and thereby to define the irradiation area (copying area) clearly by this frame member. Then, the grip portion 60f of the supporting member 60 is held and the original-holding mechanism 6 is moved to its closed position. If at this time the original-holding mechanism 6 is moved to the position shown in FIG. 7-B, the rear portion (i.e. the right portion in FIG. 7-B) of the original-holding member 58 covers the rear portions of the transparent plate 4 and of the document 78 placed thereon, and thus pushes the rear portion of the document 78 against the transparent plate 4 to prevent the movement of the document 78 with respect to the transparent plate 4. The free end edge portion of the original-holding member 58 moves slightly away from the axis 74 with respect to the support member 60 according to the stiffness of the original-holding member 58. When the original-holding mechanism 6 is further moved toward its closed position, the original-holding member 58 progressively covers the transparent plate 4 and the original document 78 placed on it from rear to front (i.e., from right to left in FIG. 7-B) and the free end edge portion of the original-holding member 58 progressively moves away from the axis 74 with respect to the supporting member 60. When it is moved further to the closed position shown in FIG. 7-C, the original-holding member 58 extends along the transparent plate 4 and the document 78 placed thereon and completely covers them, and the free end edge portion of the original-holding member 58 moves relative to the supporting member 60 to a position at which it abuts against, or comes close to, the junction of the portions 60d and 60e of the supporting member 60.

In taking out the original document 78 from the surface of the transparent plate 4 after the end of the copying operation, it is sufficient to hold the grip portion 60f of the support member 60 and move the original-holding mechanism 6 from the closed position shown in FIG. 7-C through the position shown in FIG. 7-B to the position shown in FIG. 7-A. As a result, quite contrary to the behavior of the original-holding member 58 during the above closing movement, the original-holding member 58 is detached progressively from the transparent plate 4 and the document 78 placed thereon from front to rear (i.e., from left to right in FIGS. 7-A, 7-B and 7-C), and the free end edge portion of the original-holding member 58 gradually moves toward the axis 74 relative to the supporting member 60 owing to the weight of the original-holding member 58. When the original-holding mechanism 6 is moved open to the position shown in FIG. 7-A, the original-holding member 58 is completely detached from the original document 78 which remains on the transparent plate 4, and therefore the document 78 can be withdrawn from the surface of the transparent plate 4.

In the original-holding mechanism 6 improved in accordance with this invention, the free end edge portion of the original-holding member made of a flexible material is connected to the free end portion of the supporting member 60 for free movement over the predetermined range 76. Accordingly, the original-holding member 58 properly flexes during the closing and opening movement of the original-holding mechanism 6. During the closing movement, the member 58 covers the original document 78 placed on the transparent plate 4 progressively from rear to front (from right to left in FIGS. 7-A, 7-B and 7-C), and during the opening movement, it is detached from the original document 78 on the transparent plate 4 progressively from front to rear (from left to right in FIGS. 7-A, 7-B and 7-C). Thus, even if the document 78 to be copied is a single thin sheet, it is not moved on the transparent plate 4 by the action of air flow, etc. generated by the closing movement of the original-holding member 58. The document 78 does not adhere to the inside surface of the original-holding member 58 (the surface which contacts the document 78) at the time of the opening movement of the original-holding member 58, and therefore, the original document 78 is not moved concomitantly with the opening movement of the original-holding member 58.

In a conventional original-holding mechanism, the free end portion of the original-holding member is connected substantially non-movably to the free end portion of the supporting member although there is some play. Accordingly, during the opening and closing movement of the original-holding mechanism, the original-holding member scarcely flexes but behaves as if it were substantially a rigid body. Thus, it moves in a substantially straightly extending condition during the opening and closing movement of the original-holding mechanism. The original-holding member, therefore, does not contact the original document on the transparent plate before the original-holding member is brought to the closed position of a position immediately before it. It makes contact almost at once with the entire surface of the original document at the closed position or a position immediately before it. Accordingly, the document on the transparent plate is likely to move from a predetermined position owing to air flow, etc. generated by the closing movement of the original-holding member, and in order to prevent movement of the original document, the operator must hold the original document at a predetermined position by one hand while manipulating the original-holding mechanism by the other hand. Furthermore, during the opening movement, the inside surface of the original-holding member tends to depart almost at once from the entire surface of the document on the transparent plate. As a result, the document tends to be attracted to the inside surface of the original-holding member and be moved concomitantly with the opening movement of the original-holding member.

The above problem residing with the conventional original-holding mechanism could be solved by making the original-holding mechanism only of a flexible original-holding member and manipulating the original-holding member in such a manner that it shows the behavior described with reference to FIGS. 7-A, 7-B and 7-C during the closing and opening movement of the original-holding mechanism. Needless to say, the operator must naturally grip the flexible original-holding member itself and manipulate it so that it shows the required behavior, and the operation becomes complex. Moreover, it is impossible to maintain the original-holding member at the open position illustrated in FIG. 7-A without supporting it by hand, and this causes inconvenience in that in placing an original document on the transparent plate, the original-holding member must be supported by one hand at the open position.

While the original-holding mechanism 6 improved in accordance with this invention has been described hereinabove with regard to the original-support device 8 mounted reciprocably on the top surface of the housing 2, it can be equally applied to a fixed-type original-support device which is not movable with respect to the housing 2.

In the illustrated embodiment, the supporting member 60 is formed of a metallic rod bent in a suitable configuration. If desired, the support member 60 may be formed of a plate-like structure of a suitable configuration.

Furthermore, fixing of the reinforcing pieces 62 and 68 to the rear end edge portion and the front end edge portion of the original-holding member 58 is preferable but not essential. If desired, therefore, the reinforcing pieces 62 and 68 may be omitted.

Furthermore, instead of fixing the reinforcing pieces 62 and 68, a similar reinforcing effect may be achieved by increasing the thickness of the original-holding member 58 locally at its rear end edge portion and front end edge portion, for example, to render these portions semi-rigid or rigid.

In the illustrated embodiment, the original-holding member 58 is mounted in a predetermined position by fixing the projecting portion 64 of the reinforcing piece 62, which is fixed to the rear end edge portion of the original-holding member 58, to the movable support frame 22. If desired, instead of this construction, the rear end edge portion itself of the original-holding member 58 may be directly fixed to the movable support frame 22 to mount the original-holding member 58 as required. Moreover, the rear end edge portion of the original-holding member 58 can be fixed not to the support frame 22 but, for example, to the base portion of the supporting member 60. Furthermore, the rear end portion of the original-holding member 58 is fixed to the movable support frame 22 or to the base portion of the supporting member 60 either directly or indirectly through the reinforcing piece 62. If desired, it may be pivotally connected to such members instead of being fixed thereto.

While the invention has been described hereinabove with regard to the preferred embodiments of the invention, it is apparent that the invention is not limited to these specific embodiments, and various changes and modifications are possible without departing from the scope of the invention.

What we claim is:

1. In an original-holding mechanism for an original-support device in a copying apparatus, said original-holding mechanism including a flexible holding member for covering an original document placed on a transparent plate and a rigid supporting member located outwardly of the flexible holding member with respect to the transparent plate; the improvement comprising first means mounting the flexible holding member with one end edge portion thereof adjacent to one end edge of the transparent plate, second means mounting the base portion of the rigid supporting member for pivotal movement about an axis extending along said one end edge of the transparent plate, a first reinforcing piece extending along and affixed to the free end edge portion of the flexible holding member, a connecting member fixed to the reinforcing piece at an intermediate portion thereof in the direction of said axis and slidably connected to the free end portion of the rigid supporting member for slidable movement over a predetermined range thereon in a direction perpendicular to said axis, whereby the free end edge portion of the flexible holding member is connected to the free end portion of the rigid supporting member and is slidable with respect thereto to permit movement over the predetermined range.

2. In the original-holding mechanism of claim 1, the further improvement wherein said first means comprises a second reinforcing piece extending along said one end edge portion of the flexible holding member and fixed to the outside surface of said one end edge portion, and third means mounting the second reinforcing piece adjacent to said one end edge of the transparent plate.

3. In the original-holding mechanism of claim 2, the further improvement wherein said third means comprises a projecting portion projecting beyond said one end edge portion of the flexible holding member, and means fixing the projecting portion adjacent to said one end edge of the transparent plate.

4. In the original-holding mechanism of claim 1, the further improvement wherein said rigid supporting member comprises a metal rod having first and second end portions, each extending from the base portion thereof in a direction perpendicular to said axis and spaced apart in the direction of said axis, third and fourth portions extending respectively from ends of the first and second end portions in directions inclined toward each other, fifth and sixth portions spaced from each other and extending respectively from ends of the third and fourth portions in a direction perpendicular to said axis, seventh and eighth portions extending respectively from ends of the fifth and sixth portions in an upwardly inclined direction normal to the axis, and a ninth portion joining ends of the seventh and eighth portion to permit gripping of said rigid supporting member.

5. In the original-holding mechanism of claim 4, the further improvement wherein said connecting member is slidably connected to the seventh and eighth portions of the rigid supporting member.

* * * * *